United States Patent Office 3,634,411
Patented Jan. 11, 1972

3,634,411
DERIVATIVES OF 1-(3,4,5-TRIMETHOXY CIN-NAMOYL)-PIPERAZINE AND PROCESS FOR THEIR PREPARATION
Claude P. Fauran and Guy M. Raynaud, Paris, Bernard M. Pourrias, Meudon la Foret, and Michel J. Turin, Paris, France, assignors to Delalande S.A., Courbevoie (Hauts-de-Seine), France
No Drawing. Filed Apr. 1, 1969, Ser. No. 812,369
Claims priority, application Great Britain, Apr. 3, 1968, 16,113/68
Int. Cl. C07d 51/70
U.S. Cl. 260—240 J
7 Claims

ABSTRACT OF THE DISCLOSURE

A compound of the formula

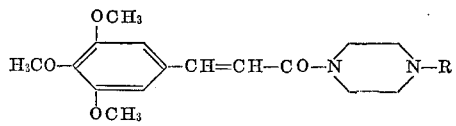

in which R is (1) aliphatic (1–4C) which may be hydroxyl substituted, (2) arylaliphatic, (3)

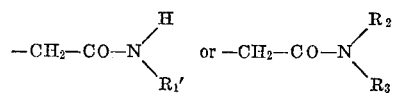

wherein $R_1$, $R_2$ and $R_3$ are alkyl (1–4C), phenyl or substituted phenyl or aralkyl, or (4) —$CH_2$—CO—N< in which —N< forms a heterocyclic radical. The compound is formed by reacting a 3,4,5-trimethoxy halogenide with piperazine substituted with R. The compounds possess coronary-dilatory, hypotensive, vasodilatory and diuretic properties.

---

The present invention relates to novel derivatives of N-(3,4,5-trimethoxy cinnamoyl) piperazine and their process of preparation.

The compounds of the present invention, which possess interesting therapeutic properties, correspond to the general formula:

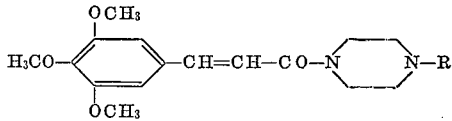

(1)

in which R represents:

an aliphatic radical having 1 to 4 carbon atoms, which radical may be substituted by one or more hydroxyl radicals;
an arylaliphatic radical, in which the aliphatic portion thereof may either be substituted by one or more hydroxyl radicals or be unsaturated, such as a cinnamyl radical;
a radical of the formula:

—$CH_2$—CO—$NHR_1$ (2)

in which $R_1$ represents:

an alkyl radical having 1 to 4 carbon atoms, such as a methyl, ethyl, propyl or isopropyl radical;

a phenyl radical which may be substituted by an alkoxy radical having 1 to 4 carbon atoms, such as a methoxy radical, by a trifluoromethyl radical or by a halogen atom, such as a chlorine atom; or
an aralkyl radical, such as a benzhydryl radical;
a radical of the formula:

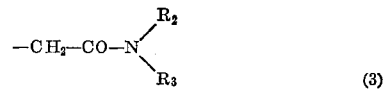

(3)

in which $R_2$ and $R_3$ have the same significance as $R_1$; or a radical of the formula:

(4)

in which the nitrogen atom forms part of a heterocyclic radical, such as a morpholino, hexamethylene-imino or pyrrolidino radical.

The process for preparing the compounds of the present invention comprises reacting a 3,4,5-trimethoxy cinnamoyl halogenide of the general formula

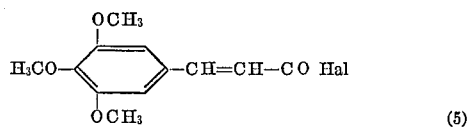

(5)

in which Hal represents a halogen atom, with a piperazine of the general formula:

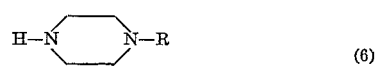

(6)

in which R has the same signification as in Formula 1, the reaction being carried out in an organic solvent and in the presence of an alkaline agent which is capable of combining with the hydracid formed in the course of the reaction. The derivative obtained is recovered by usual means, such as by evaporation of the solvent and recrystallisation.

In a preferred method of carrying out the above process, 3,4,5-trimethoxy cinnamoyl chloride is used and the reaction is carried out in benzene or acetone, at the boiling temperature of the reaction medium, the alkaline agent being neutral or acidic sodium carbonate.

When the radical R of the general Formula 1 represents an aminated chain, the compounds according to the present invention have a basic character and yield salts by the addition thereto of mineral or organic acids.

The following examples, which are not intended to be limiting, illustrate the present invention.

EXAMPLE 1

N-(3,4,5-trimethoxy cinnamoyl)-N'-(pyrrolidino carbonylmethyl) piperazine and its maleate (No. 67350)

20 g. of N-(pyrrolidino carbonylmethyl) piperazine is dissolved in 350 ml. of anhydrous benzene and 12 g. of sodium bicarbonate is added thereto. 3,4,5-trimethoxy cinnamoyl chloride is progressively introduced into the mixture, the temperature of which rises to 40° C. The mixture is then refluxed for 1 hour. After cooling, an aqueous solution of Na$_2$CO$_3$ is added thereto, and agitation is continued for several minutes. After decantation and concentration of the benzene phase, the crude product is obtained which is recrystallised from a mixture of methyl ethyl ketone and heptane. Yield=65%.

*Elementary analysis.*—Calculated (percent): C, 63.29; H, 7.48; N, 10.07. Found (percent): C, 63.18; H, 7.51; N, 10.04.

The acetonic solution of this base, when treated with the equivalent of maleic acid, yields the maleate which is recrystallised from absolute alcohol. Melting point=135° C.

*Elementary analysis.*—Calculated (percent): C, 58.52; H, 6.61; N, 7.88. Found (percent): C, 58.43; H, 6.72; N, 7.90.

EXAMPLE 2

N-(3,4,5-trimethoxy cinnamoyl)-N'-(2',3'-dihydroxy propyl) piperazine and its hydrochloride (No. 67296)

25.5 g. of 3,4,5-trimethoxy cinnamoyl chloride is added to a benzene solution of 16 g. of (2,3-dihydroxypropyl) piperazine, in the presence of sodium bicarbonate. The mixture is refluxed for 3 hours. After cooling, an aqueous solution of 5% (200 ml.) sodium carbonate is added thereto, and agitation is continued for 15 minutes. After decantation and concentration of the benzene phase, a viscous residue is obtained which is crystallised from methyl ethyl ketone. Melting point=145° C. Yield=60%.

*Elementary analysis.*—Calculated (percent): C, 59.98; H, 7.42; N, 7.36. Found (percent): C, 60.00; H, 7.20; N, 720.

The methanolic solution of this base, when treated with dry hydrochloric acid, yields the hydrochloride which is recrystallised from absolute alcohol. Melting point=200° C.

*Elementary analysis.*—Calculated (percent): C, 54.74; H, 7.01; N, 6.72; Cl, 8.51. Found (percent): C, 54.65; H, 6.91; N, 6.63; Cl, 8.74.

EXAMPLE 3

N-(3,4,5-trimethoxy cinnamoyl)N'-(cinnamyl) piperazine maleate (No. 67370)

According to the procedure described in Examples 1 and 2, the desired derivative is obtained in a yield of 73%. Melting point=170° C.

*Elementary analysis.*—Calculated (percent): C, 64.67; H, 6.36; N, 5.20. Found (percent): C, 64.77; H, 6.28; N, 5.03.

EXAMPLE 4

N - (3,4,5 - trimethoxy cinnamoyl) - N' - (2'-phenyl-2'-hydroxy-1'-propyl) piperazine hydrochloride (No. 67381)

25 g. of 3,4,5-trimethoxy cinnamoyl chloride is dissolved in 200 ml. of acetone, and 12.5 g. of sodium bicarbonate is added thereto. An acetonic solution of N-(2-phenyl-2-hydroxy-1-propyl) piperazine is then added to the mixture dropwise with agitation. Agitation of the mixture is continued for two hours at ambient temperature. The acetone is then distilled off and the residue is recovered from a mixture of water and ethyl acetate, the pH being adjusted to 9–10 by the addition of Na$_2$CO$_3$.

After decantation of the organic phase and treatment thereof with gaseous hydrochloric acid, a monohydrated hydrochloride is obtained which is recrystallised from a mixture of water and acetone. Melting point=140° C. Yield=45%.

*Elementary analysis.*—Calculated (percent): C, 60.66; H, 7.13; N, 5.66; Cl, 7.16. Found (percent): C, 60.45; H, 7.15; N, 5.83; Cl, 7.34.

The compounds listed in the following tables have been prepared in accordance with the procedure adopted in the above examples.

TABLE I

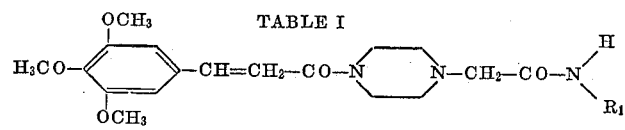

| Compound Number | R$_1$ | Form | Empirical Formula | Molecular weight | Melting point, °C. |
|---|---|---|---|---|---|
| 68141 | —CH$_3$ | Base | C$_{19}$H$_{27}$N$_3$O$_5$ | 377.43 | 154 |
|  |  | Maleate | C$_{23}$H$_{31}$N$_3$O$_9$ | 493.50 | 164 |
| 68164 | —C$_2$H$_5$ | Base | C$_{20}$H$_{29}$N$_3$O$_5$ | 391.46 | 174 |
|  |  | Hydrochloride | C$_{20}$H$_{30}$ClN$_3$O$_5$ | 427.92 | 200 |
| 68119 | —C$_3$H$_7$ | Base | C$_{21}$H$_{31}$N$_3$O$_5$ | 405.48 | 160 |
|  |  | Maleate | C$_{25}$H$_{35}$N$_3$O$_9$ | 521.54 | 114 |
| 68111 | -iso C$_3$H$_7$ | Base | C$_{21}$H$_{31}$N$_3$O$_5$ | 405.48 | 175 |
|  |  | Maleate | C$_{25}$H$_{35}$N$_3$O$_9$ | 521.55 | 152 |
| 68110 | ⬡ | Base | C$_{24}$H$_{29}$N$_3$O$_5$ | 439.50 | 180 |
|  |  | Hydrochloride | C$_{24}$H$_{30}$ClN$_3$O$_5$ | 475.96 | 200 |
| 68112 | ⬡—OCH$_3$ | Base | C$_{25}$H$_{31}$N$_3$O$_6$ | 469.52 | 178 |
|  |  | Hydrochloride | C$_{25}$H$_{32}$ClN$_3$O$_6$ | 505.99 | 190 |
| 68126 | ⬡ CF$_3$ | Base | C$_{25}$H$_{28}$F$_3$N$_3$O$_5$ | 507.50 | 174 |
|  |  | Hydrochloride | C$_{25}$H$_{29}$ClF$_3$N$_3$O$_5$ | 543.96 | 194 |
| 68144 | ⬡ Cl | Base | C$_{24}$H$_{28}$ClN$_3$O$_5$ | 473.95 | 174 |
|  |  | Maleate | C$_{28}$H$_{32}$ClN$_3$O$_9$ | 590.02 | 178 |
| 68147 | —CH(⬡)(⬡) | Base | C$_{31}$H$_{35}$N$_3$O$_5$ | 529.61 | 214 |
|  |  | Hydrochloride | C$_{31}$H$_{36}$ClN$_3$O$_5$ | 566.08 | 230 |

The novel derivatives of N-(3,4,5-trimethoxy cinnamoyl) piperazine have been studied on animals in the laboratory, and have shown coronary-dilatory, hypotensive, cardiotropic, vasodilatory and diuretic properties.

(1) Coronary-dilatory properties.—The coronary circulation has been studied in dogs by measuring the output of the coronary venous sinus. The novel piperazines of the invention when administered by intravenous perfusion, provoke an augmentation of the output of the coronary venous sinus and a diminuation of the consumption of oxygen by the cardiac muscle coupled with a favourable effect on the cardiac metabolism. In addition, there is observed a diminution of cardiac work and of cardiac rhythm.

The results obtained with a certain number of the compounds referred to herebefore are listed in the following table.

TABLE IV

| Compound Number | Dose administered in mg./kg. | Augmentation of coronary output, percent | Diminution of the cardiac consumption of oxygen, percent |
|---|---|---|---|
| 67296, hydrochloride | 25 | 100 | 50 |
| 67350, maleate | 25 | 100 | 50 |
| 68125, maleate | 25 | 70 | 30 |
| 68124, maleate | 10 | 50 | 40 |
| 68111, maleate | 6.5 | ¹50 | ¹40 |
| 68127, maleate | 25 | (²) | (²) |
| 68118, maleate | 12.5 | 100 | 25 |
| 68141, maleate | 25 | ¹50 | ¹30 |

¹ For a period in excess of 2 hours.
² For 60 min.

(2) Hypotensive properties.—This action has been observed:
in the anaesthetized dog and cat, wherein the piperazines are administered by intravenous or intro duodenal means;
in the non-anaesthetized rat, the piperazines being administered by oral means.

The results obtained with a certain number of compounds corresponding to the general Formula 1 and administered by intravenous means to an anaesthetized cat are listed in the following table.

TABLE V

| Compound Code Number | Dose administered, mg./kg. | Reduction of the arterial pressure, percent | Duration of hypotension, mn. |
|---|---|---|---|
| 68111 | 12 | 50 | 30–60 |
| 68127 | 10 | 25 | 30–60 |
| 68118 | 12.5 | 25 | 30–60 |
| 68141 | 5 | 50 | 30–60 |

The compound No. 6811 administered by oral means to a non-anaesthetized rat in a dose of 50 mg./kg., provokes a reduction of the systolic pressure by 20%.

(3) Action on the heart.—In addition to the diminution of cardia work and cardiac rhythm previously mentioned the novel piperazines exert an anti-arythmic effect, as evidenced on the isolated auricle of the heart of a guinea-pig, electrically stimulated with increasing frequency.

(4) Vaso-dilatory action.—On the level of the peripheric circulation, the novel piperazines show vaso-dilatory properties, as evidenced by an augmentation of the output of the femoral artery of dogs as measured by a rotameter interposed in the course of the artery. The dose which augmented an output of 50% is generally about 125 μg./kg. by intraarterial injection.

(5) Diuretic activity.—The novel piperazines significantly augment the urinary output and the elimination of Cl⁻ and Na⁺ ions in the non-anaesthetized rat.

(6) Toxicity.—The toxicity of the novel piperazines is weak. The $DL_{50}$ on the mouse by intravenous means is between 150 and 800 mg./kg., and by oral means between 1 and 5 g./kg.

From the above studies it can be seen that the novel N-(3,4,5-trimethoxy cinnamoyl) piperazine derivatives constitute interesting medicaments which exert very satisfactory results on the circulatory system.

They can be administered to humans in doses varying between 100 and 750 mg./day, in association with suitable excipients selected for the pharmaceutical form used.

What is claimed is:

1. A compound of the formula

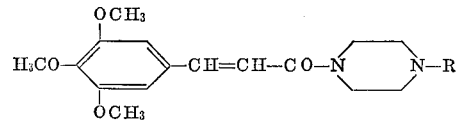

in which R is selected from the group consisting of
(A) —CH₂—CO—NHR₁
in which R₁ is selected from the group consisting of alkyl having 1 to 4 carbon atoms; phenyl and phenyl substituted by an alkoxy having 1 to 4 carbon atoms, trifluoromethyl or a halogen atom; and benzhydryl,

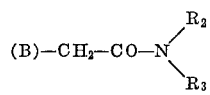

in which R₂ and R₃ have the same meaning as R₁; and

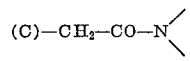

in which —N< consists of morpholino, hexamethylenimino or pyrrolidino
and the nontoxic acid addition salts thereof.

2. A compound as claimed in claim 1, in which R is

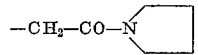

3. A compound as claimed in claim 1, in which R is

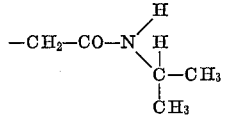

4. A compound as claimed in claim 1, in which R is
—CH₂—CO—NHR₁
in which R₁ is selected from the group consisting of methyl, ethyl, propyl and isopropyl.

5. A compound as claimed in claim 1, in which R is
—CH₂—CO—NHR₁
in which R₁ is phenyl.

6. A compound as claimed in claim 1, in which R is
—CH₂—CO—NHR₁
in which R₁ is methoxyphenyl or chlorophenyl.

7. A compound as claimed in claim 1, in which R is

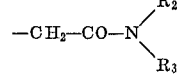

in which R₂ and R₃ are the same and are selected from the group consisting of methyl, ethyl, propyl and isopropyl and phenyl.

References Cited

UNITED STATES PATENTS 2,882,271  4/1959  Janssen _____ 260—240
3,324,117  6/1967  Schorr et al. _____ 260—240

JOHN D. RANDOLPH, Primary Examiner

U.S. Cl. X.R.

424—250

| Compound Number | Form | | Elementary analysis | | | |
|---|---|---|---|---|---|---|
| | | | C | H | Cl | N |
| 68141 | Base | Calculated | 60.46 | 7.21 | -------- | 11.13 |
| | | Found | 60.58 | 7.42 | -------- | 11.08 |
| | Maleate | Calculated | 55.97 | 6.33 | -------- | 8.52 |
| | | Found | 56.16 | 6.29 | -------- | 8.53 |
| 68164 | Base | Calculated | 61.36 | 7.47 | -------- | 10.74 |
| | | Found | 61.43 | 7.49 | -------- | 10.94 |
| | Hydrochloride | Calculated | 56.13 | 7.07 | 8.29 | 9.82 |
| | | Found | 56.23 | 7.07 | 8.39 | 9.61 |
| 68119 | Base | Calculated | 62.20 | 7.71 | -------- | 10.36 |
| | | Found | 62.40 | 7.71 | -------- | 10.37 |
| | Maleate | Calculated | 57.57 | 6.76 | -------- | 8.06 |
| | | Found | 57.37 | 6.76 | -------- | 8.03 |
| 68111 | Base | Calculated | 62.20 | 7.71 | -------- | 10.36 |
| | | Found | 62.40 | 7.66 | -------- | 10.31 |
| | Maleate | Calculated | 57.57 | 6.76 | -------- | 8.06 |
| | | Found | 57.71 | 6.85 | -------- | 8.09 |
| 68110 | Base | Calculated | 65.58 | 6.65 | -------- | 9.56 |
| | | Found | 65.73 | 6.88 | -------- | 9.36 |
| | Hydrochloride | Calculated | 60.56 | 6.35 | 7.45 | 8.83 |
| | | Found | 60.56 | 6.26 | 7.35 | 8.62 |
| 68112 | Base | Calculated | 63.95 | 6.66 | -------- | 8.95 |
| | | Found | 64.12 | 6.68 | -------- | 9.02 |
| | Hydrochloride | Calculated | 59.34 | 6.37 | 7.01 | 8.31 |
| | | Found | 59.48 | 6.51 | 7.24 | 8.17 |
| 68126 | Base | Calculated | 59.16 | 5.56 | -------- | 8.28 |
| | | Found | 59.25 | 5.72 | -------- | 8.44 |
| | Hydrochloride | Calculated | 55.20 | 5.37 | 10.48 | 7.73 |
| | | Found | 55.02 | 5.42 | 10.61 | 7.53 |
| 68144 | Base | Calculated | 60.82 | 5.96 | 7.48 | 8.87 |
| | | Found | 60.76 | 5.99 | 7.52 | 8.66 |
| | Maleate | Calculated | 56.99 | 5.47 | 6.01 | 7.12 |
| | | Found | 56.83 | 5.27 | 6.20 | 6.92 |
| 68147 | Base | Calculated | 70.30 | 6.66 | -------- | 7.93 |
| | | Found | 70.50 | 6.63 | -------- | 8.13 |
| | Hydrochloride | Calculated | 65.77 | 6.41 | 6.26 | 7.42 |
| | | Found | 65.80 | 6.48 | 6.43 | 7.24 |

| Compound Number | Form | | Elementary analysis | | | |
|---|---|---|---|---|---|---|
| | | | C | H | Cl | N |
| 68127 | Base | Calculated | 61.36 | 7.47 | -------- | 10.74 |
| | | Found | 61.49 | 7.64 | -------- | 10.79 |
| | Maleate | Calculated | 56.79 | 6.55 | -------- | 8.28 |
| | | Found | 56.65 | 6.53 | -------- | 8.23 |
| 68118 | Base | Calculated | 62.98 | 7.93 | -------- | 10.02 |
| | | Found | 62.78 | 7.73 | -------- | 10.16 |
| | Maleate | Calculated | 58.50 | 6.96 | -------- | 7.85 |
| | | Found | 58.38 | 6.85 | -------- | 7.65 |
| 68120 | Base | Calculated | 64.40 | 8.33 | -------- | 9.39 |
| | | Found | 64.19 | 8.30 | -------- | 9.48 |
| | Maleate | Calculated | 59.66 | 7.33 | -------- | 7.46 |
| | | Found | 59.82 | 7.53 | -------- | 7.58 |
| 68171 | Base | Calculated | 64.40 | 8.33 | -------- | 9.39 |
| | | Found | 64.61 | 8.41 | -------- | 9.55 |
| | Maleate | Calculated | 59.66 | 7.33 | -------- | 7.46 |
| | | Found | 59.48 | 7.45 | -------- | 7.30 |
| 68136 | Base | Calculated | 69.88 | 6.45 | -------- | 8.15 |
| | | Found | 70.08 | 6.36 | -------- | 8.11 |
| | Hydrochloride | Calculated | 65.27 | 6.21 | 6.42 | 7.61 |
| | | Found | 65.25 | 6.40 | 6.41 | 7.41 |

TABLE II

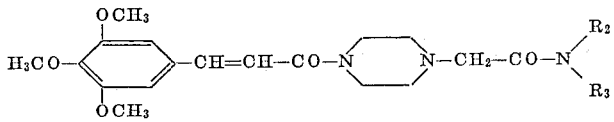

| Compound Number | $R_2 = R_3$ | Form | Empirical formula | Molecular weight | Melting point, °C. |
|---|---|---|---|---|---|
| 68127 | —$CH_3$ | Base | $C_{20}H_{29}N_3O_5$ | 391.46 | 148 |
| | | Maleate | $C_{24}H_{33}N_3O_9$ | 507.53 | 168 |
| 68118 | —$C_2H_5$ | Base | $C_{22}H_{33}N_3O_5$ | 419.51 | 104 |
| | | Maleate | $C_{26}H_{37}N_3O_9$ | 535.58 | 140 |
| 68120 | —$C_3H_7$ | Base | $C_{24}H_{37}N_3O_5$ | 447.56 | 94 |
| | | Maleate | $C_{28}H_{41}N_3O_9$ | 563.63 | 156 |
| 68171 | -iso $C_3H_7$ | Base | $C_{24}H_{37}N_3O_5$ | 447.56 | 145 |
| | | Maleate | $C_{28}H_{41}N_3O_9$ | 563.63 | 138 |
| 68136 | —⟨phenyl⟩ | Base | $C_{30}H_{33}N_3O_5$ | 515.59 | 174 |
| | | Hydrochloride | $C_{30}H_{34}ClN_3O_5$ | 552.05 | 198 |

TABLE III

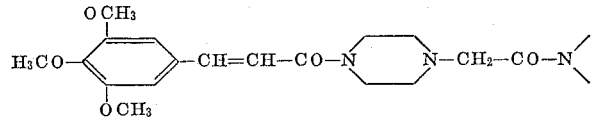

| Compound Number | —N⟨ | Form | Empirical formula | Molecular weight | Melting point, °C. |
|---|---|---|---|---|---|
| 68124 | —N⟨(CH$_2$)$_5$⟩ | Base | $C_{24}H_{35}N_3O_5$ | 445.54 | 115 |
| | | Maleate | $C_{28}H_{39}N_3O_9$ | 561.62 | 163 |
| 68125 | —N⟨(CH$_2$)$_2$O(CH$_2$)$_2$⟩ | Base | $C_{22}H_{31}N_3O_6$ | 433.49 | 144 |
| | | Maleate | $C_{26}H_{35}N_3O_{10}$ | 549.56 | 186 |

| Compound Number | Form | | Elementary analysis | | |
|---|---|---|---|---|---|
| | | | C | H | N |
| 68124 | Base | Calculated | 64.69 | 7.92 | 9.43 |
| | | Found | 64.54 | 7.91 | 9.34 |
| | Maleate | Calculated | 59.88 | 7.00 | 7.48 |
| | | Found | 59.71 | 7.14 | 7.38 |
| 68125 | Base | Calculated | 60.95 | 7.21 | 9.69 |
| | | Found | 60.89 | 7.21 | 9.56 |
| | Maleate | Calculated | 56.82 | 6.42 | 7.65 |
| | | Found | 57.02 | 6.51 | 7.62 |